US010530238B2

United States Patent
Akita et al.

(10) Patent No.: US 10,530,238 B2
(45) Date of Patent: Jan. 7, 2020

(54) POWER CONVERSION DEVICE AND METHOD FOR CONTROLLING SAME

(71) Applicant: Sumitomo Electric Industries, Ltd., Osaka-shi (JP)

(72) Inventors: Tetsuo Akita, Osaka (JP); Naoki Ayai, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 71 days.

(21) Appl. No.: 15/738,297

(22) PCT Filed: Jun. 20, 2016

(86) PCT No.: PCT/JP2016/068292
§ 371 (c)(1),
(2) Date: Dec. 20, 2017

(87) PCT Pub. No.: WO2016/208544
PCT Pub. Date: Dec. 29, 2016

(65) Prior Publication Data
US 2018/0183319 A1    Jun. 28, 2018

(30) Foreign Application Priority Data

Jun. 22, 2015  (JP) ................................ 2015-124600

(51) Int. Cl.
*H02J 7/00*  (2006.01)
*H02M 1/08*  (2006.01)
(Continued)

(52) U.S. Cl.
CPC .......... *H02M 1/083* (2013.01); *H02J 7/0068* (2013.01); *H02J 7/0081* (2013.01); *H02M 3/155* (2013.01);
(Continued)

(58) Field of Classification Search
CPC ...... H02M 1/083; H02M 3/155; H02M 3/158; H02M 7/5387; H02M 7/797; H02J 7/0068; H02J 7/0081; H02J 7/045
(Continued)

(56) References Cited

U.S. PATENT DOCUMENTS

2004/0008007 A1*  1/2004  Nagai ................... H02J 7/0055
                                                           320/134
2012/0106218 A1*  5/2012  Awane .................. H02M 3/335
                                                           363/127

FOREIGN PATENT DOCUMENTS

JP   2003-348768 A   12/2003
JP   2014-241714 A   12/2014

* cited by examiner

*Primary Examiner* — Zixuan Zhou
(74) *Attorney, Agent, or Firm* — Baker Botts L.L.P.; Michael A. Sartori (57) ABSTRACT

A power conversion device includes a switch connected to an AC system; an AC/DC converter; and a DC/DC converter. A control unit compares an absolute value of an AC voltage target value based on the AC voltage with a DC voltage target value based on the storage battery voltage, and executes, on the basis of a magnitude relation of the values, a control method such that a period during which step-up operation is performed through switching operation mainly using one of the AC/DC converter and the DC/DC converter, and a period during which step-down operation is performed through switching operation mainly using the other one of the converters, alternately arise. When starting charging/discharging of the storage battery, the control unit causes the switch to close at zero cross timing of the AC voltage, and thereafter, causes charging/discharging to start from the switching operation through which the step-down operation is performed.

7 Claims, 7 Drawing Sheets

(51) Int. Cl.
*H02M 3/155* (2006.01)
*H02M 7/797* (2006.01)
*H02M 1/00* (2006.01)

(52) U.S. Cl.
CPC .... *H02M 7/797* (2013.01); *H02M 2001/0058* (2013.01)

(58) Field of Classification Search
USPC .......................................... 320/134; 363/17
See application file for complete search history.

POWER CONVERSION DEVICE AND METHOD FOR CONTROLLING SAME

TECHNICAL FIELD

The present invention relates to a power conversion device and a method for controlling the power conversion device.

This application claims priority on Japanese Patent Application No. 2015-124600 filed on Jun. 22, 2015, the entire contents of which are incorporated herein by reference.

BACKGROUND ART

Power conversion devices that provide power from a storage battery to an AC load are often used in backup power supply devices such as UPS (Uninterruptible Power Supply) (for example, refer to Patent Literature 1 (FIG. 1)). Such a power conversion device includes a DC/DC converter for stepping up a voltage of the storage battery, and an inverter for performing conversion from DC to AC.

In this case, the DC/DC converter steps up the voltage of the storage battery to a constant level equal to or higher than a required AC peak value through high-frequency switching, and outputs the stepped-up voltage to a DC bus. The inverter modulates the constant voltage so as to have an AC waveform through high-frequency switching. Therefore, the DC/DC converter and the inverter each always perform high-frequency switching.

Normally, the power conversion device has a bidirectional property, and is capable of converting an AC voltage outputted from an AC power supply such as a commercial power supply to a DC voltage suitable for charging, and charging the storage battery. In this case, the inverter operates as an AC/DC converter, and full-wave rectifies the AC waveform. The full-wave-rectified waveform is smoothed by a capacitor. Meanwhile, the DC/DC converter exerts a step-down function. The AC/DC converter can perform the full-wave rectification by using diodes connected in reverse-parallel to switching elements. In this case, four switching elements forming the AC/DC converter are kept OFF.

In the power conversion device, when discharging the storage battery, the DC/DC converter and the inverter each always perform high-frequency switching. Due to the high-frequency switching, the corresponding switching loss occurs, and the switching loss causes deterioration in conversion efficiency. In order to reduce such switching loss to enhance the conversion efficiency, for example, a control method can be adopted in which the DC/DC converter and the inverter are caused to alternately perform switching operations within one cycle of AC (for example, refer to Patent Literature 2). In this case, the number of times of switching in the power conversion device as a whole can be reduced. The control method for causing the DC/DC converter and the inverter to alternately perform switching operations within one cycle of AC as described above can be similarly executed in a reverse direction.

CITATION LIST

Patent Literature

PATENT LITERATURE 1: Japanese Laid-Open Patent Publication No. 2003-348768
PATENT LITERATURE 2: Japanese Laid-Open Patent Publication No. 2014-241714

SUMMARY OF INVENTION

One aspect of the present invention is a power conversion device which is provided between an AC system and a storage battery, and includes: a switch provided in an electric path connected to the AC system; a voltage sensor configured to detect an AC voltage of the AC system; an AC/DC converter provided between the switch and a DC bus; a capacitor connected to the DC bus; a DC/DC converter provided between the DC bus and the storage battery; a voltage sensor configured to detect a voltage between both ends of the storage battery, as a storage battery voltage; and a control unit. The control unit is configured to: compare an absolute value of an AC voltage target value based on the AC voltage with a DC voltage target value based on the storage battery voltage; execute, on the basis of a magnitude relation of the values, a control method such that a period during which step-up operation is performed through switching operation mainly using one of the AC/DC converter and the DC/DC converter, and a period during which step-down operation is performed through switching operation mainly using the other one of the converters, alternately arise; and when starting charging/discharging of the storage battery, cause the switch to close at zero cross timing of the AC voltage, and thereafter, cause charging/discharging to start from the switching operation through which the step-down operation is performed.

Another aspect of the present invention is a method for controlling a power conversion device which is provided between an AC system and a storage battery, and includes a switch provided in an electric path connected to the AC system, an AC/DC converter provided between the switch and a DC bus, a capacitor connected to the DC bus, and a DC/DC converter provided between the DC bus and the storage battery. This method includes: comparing an absolute value of an AC voltage target value based on the AC voltage of the AC system with a DC voltage target value based on the storage battery voltage; and executing, on the basis of a magnitude relation of the values, a control method such that a period during which step-up operation is performed through switching operation mainly using one of the AC/DC converter and the DC/DC converter, and a period during which step-down operation is performed through switching operation mainly using the other one of the converters, alternately arise. In this method, when starting charging/discharging of the storage battery, the switch is closed at zero cross timing of the AC voltage, and thereafter, charging/discharging is started from the switching operation through which the step-down operation is performed.

DESCRIPTION OF EMBODIMENTS

Problems to be Solved by the Disclosure

In the case where the control method capable of decreasing the number of times of switching as described above is used, for example, when charging is started at zero cross timing of the AC voltage, switching operation is started from the state where the voltage on the DC bus is higher than the absolute value of the AC voltage and where directivity of a current is not determined yet. Therefore, the current may flow backward from the DC bus to the AC side. Such backflow of the current does not cause a particular problem because it occurs in a very short time. However, in order to further improve charging efficiency, it is desired to inhibit the backflow of the current.

In view of the above problem, an object of the present disclosure is to inhibit backflow of a current at start of charging/discharging, in a power conversion device in which two converters alternately perform switching operations.

Effects of the Disclosure

According to the present disclosure, it is possible to inhibit backflow of a current at start of charging/discharging.

SUMMARY OF EMBODIMENTS

Summary of embodiments of the present invention includes at least the following.

(1) A power conversion device is provided between an AC system and a storage battery, and includes: a switch provided in an electric path connected to the AC system; a voltage sensor configured to detect an AC voltage of the AC system; an AC/DC converter provided between the switch and a DC bus; a capacitor connected to the DC bus; a DC/DC converter provided between the DC bus and the storage battery; a voltage sensor configured to detect a voltage between both ends of the storage battery, as a storage battery voltage; and a control unit. The control unit is configured to, when an absolute value of an AC voltage target value based on the AC voltage is smaller than a DC voltage target value based on the storage battery voltage: compare the absolute value of the AC voltage target value based on the AC voltage with the DC voltage target value based on the storage battery voltage; execute, on the basis of a magnitude relation of the values, a control method such that a period during which step-up operation is performed through switching operation mainly using one of the AC/DC converter and the DC/DC converter, and a period during which step-down operation is performed through switching operation mainly using the other one of the converters, alternately arise; and when starting charging/discharging of the storage battery, cause the switch to close at zero cross timing of the AC voltage, and thereafter, cause charging/discharging to start from the switching operation through which the step-down operation is performed.

In the power conversion device configured to execute the control method described above, which of the AC/DC converter and the DC/DC converter mainly executes switching operation depends on the timing to start charging/discharging. If one of the two converters starts charging/discharging from switching operation for step-up operation, since the voltage of the target to be charged/discharged is higher than that of the converter, a current may flow in a direction reverse to the direction of charging/discharging. However, when charging/discharging is started from switching operation for "step-down operation", since the charging/discharging is started from the state where the voltage of the target to be charged/discharged is lower than that of the converter, it is possible to prevent a current from flowing in a direction reverse to an intended direction.

(2) In the power conversion device according to (1), in a case of charging the storage battery, when the absolute value of the AC voltage target value is smaller than the DC voltage target value, the control unit causes the step-up operation to be performed through the switching operation mainly using the AC/DC converter; and when the absolute value of the AC voltage target value is greater than the DC voltage target value, the control unit causes the step-down operation to be performed through the switching operation mainly using the DC/DC converter. When starting charging of the storage battery, the control unit causes the switch to close at the zero cross timing of the AC voltage, and thereafter, causes charging to start within a period during which the absolute value of the AC voltage target value is greater than the DC voltage target value.

In the case of charging the storage battery, if charging is started within the period during which the AC voltage target value is greater than the DC voltage target value, this charging is started from switching operation for step-down operation by the DC/DC converter, and therefore, it is possible to prevent a current from flowing in a direction reverse to the direction of charging.

(3) In the power conversion device according to (1), in a case of discharging the storage battery, when the absolute value of the AC voltage target value is greater than the DC voltage target value, the control unit causes the step-up operation to be performed through the switching operation mainly using the DC/DC converter, and when the absolute value of the AC voltage target value is smaller than the DC voltage target value, the control unit causes the step-down operation to be performed through the switching operation mainly using the AC/DC converter. When starting discharging of the storage battery, the control unit causes the switch to close at the zero cross timing of the AC voltage, and thereafter, causes discharging to start within a period during which the absolute value of the AC voltage target value is smaller than the DC voltage target value.

In the case of discharging the storage battery, if discharging is started within the period during which the AC voltage target value is smaller than the DC voltage target value, this discharging is started from switching operation for step-down operation by the AC/DC converter, and therefore, it is possible to prevent a current from flowing in a direction reverse to the direction of discharging.

(4) In the power conversion device according to (1), in a case of discharging the storage battery, when the absolute value of the AC voltage target value is greater than the DC voltage target value, the control unit causes the step-up operation to be performed through the switching operation mainly using the DC/DC converter, and when the absolute value of the AC voltage target value is smaller than the DC voltage target value, the control unit causes the step-down operation to be performed through the switching operation mainly using the AC/DC converter. When starting discharging of the storage battery, the control unit causes a stand-alone switch to close at zero cross timing of a stand-alone AC voltage, with the switch provided in the electric path being open, and thereafter, causes discharging to start within a period during which the absolute value of the AC voltage target value is smaller than the DC voltage target value.

In the case of discharging the storage battery, if discharging is started within the period during which the AC voltage target value is smaller than the DC voltage target value, this discharging is started from switching operation for step-down operation by the AC/DC converter, and therefore, it is possible to prevent a current from flowing in a direction reverse to the direction of discharging.

(5) In the power conversion device according to (2), the control unit preferably updates a command value for attaining an AC current target value in charging, at zero cross timing of the AC voltage.

In this case, updating of PWM duty in association with updating of the command value is performed at the zero cross timing. Therefore, it is possible to inhibit sharp change in the current, and oscillation.

(6) Meanwhile, a method for controlling a power conversion device is provided, which device is provided between an AC system and a storage battery, and includes a switch provided in an electric path connected to the AC system, an AC/DC converter provided between the switch and a DC bus, a capacitor connected to the DC bus, and a DC/DC converter provided between the DC bus and the storage battery. The method includes: comparing an absolute value of an AC voltage target value based on the AC voltage of the AC system with a DC voltage target value based on the storage battery voltage; and executing, on the basis of a magnitude relation of the values, a control method such that a period during which step-up operation is performed through switching operation mainly using one of the AC/DC converter and the DC/DC converter, and a period during which step-down operation is performed through switching operation mainly using the other one of the converters, alternately arise. In this method, when starting charging/discharging of the storage battery, the switch is closed at zero cross timing of the AC voltage, and thereafter, charging/discharging is started from the switching operation through which the step-down operation is performed.

In the method for controlling the power conversion device in which the control method is executed, which of the AC/DC converter and the DC/DC converter mainly executes switching operation depends on the timing to start charging/discharging. If one of the two converters starts charging/discharging from switching operation for step-up operation, since the voltage of the target to be charged/discharged is higher than that of the converter, a current may flow in a direction reverse to the direction of charging/discharging. However, when charging/discharging is started from switching operation for "step-down operation", since the charging/discharging is started from the state where the voltage of the target to be charged/discharged is lower than that of the converter, it is possible to prevent a current from flowing in a direction reverse to an intended direction.

DETAILS OF EMBODIMENTS

<Charge/Discharge System>

Figure 1:
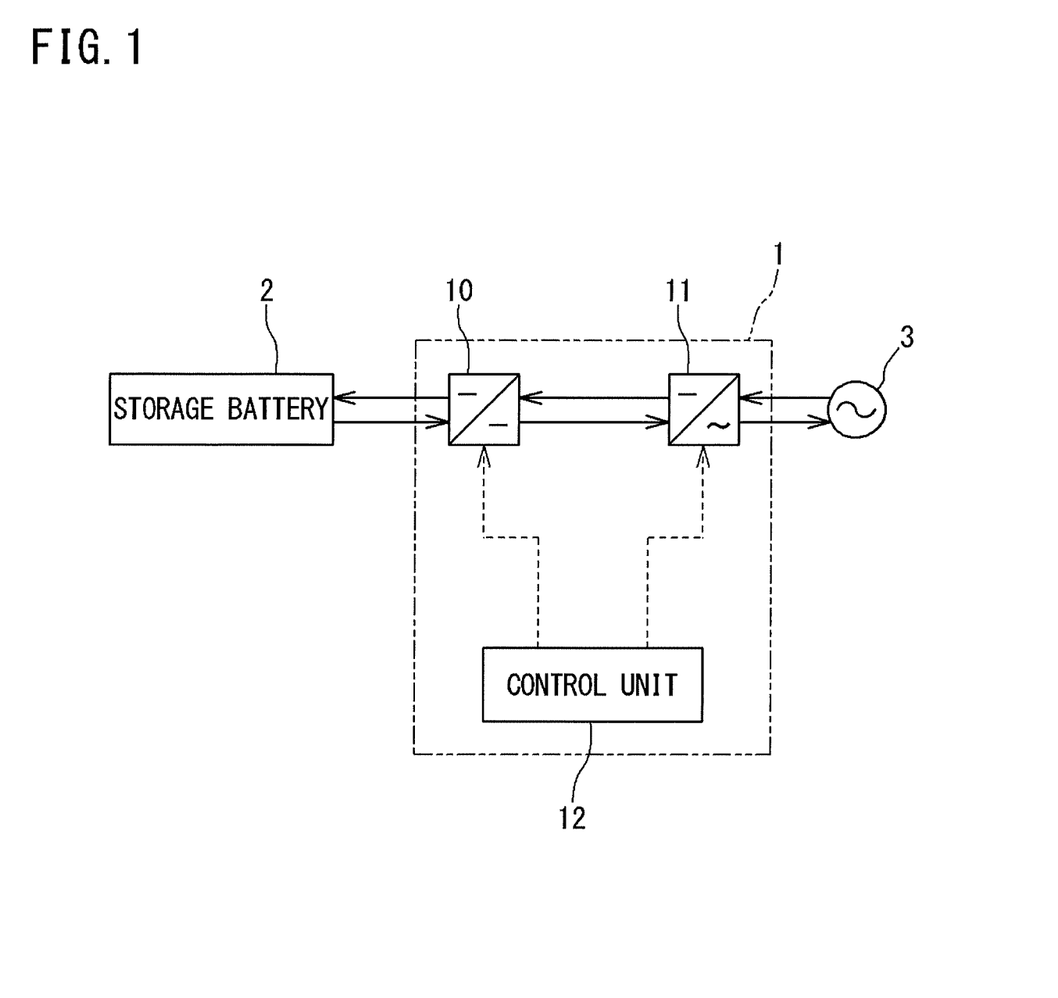
FIG. 1 is a single-line connection diagram showing an example of a charge/discharge system including a power conversion device according to one embodiment of the present invention.

FIG. 1 is a single-line connection diagram showing an example of a charge/discharge system including a power conversion device according to one embodiment of the present invention. In FIG. 1, a storage battery 2 is connected to one end of a power conversion device 1, and an AC system 3 is connected to the other end thereof. This charge/discharge system operates such that AC power from the AC system 3 is converted to DC power by the power conversion device 1, and the storage battery 2 is charged with the DC power. Reversely, the charge/discharge system is also able to discharge the storage battery 2, convert DC power from the storage battery 2 to AC power by the power conversion device 1, and supply the AC power to a load of the AC system 3.

A voltage of the storage battery 2 is, for example, 48 V, and a voltage of the AC system 3 is, for example, 100 V. However, the voltage values are not limited to these values.

The power conversion device 1 includes, as main components, a DC/DC converter 10 provided on the storage battery 2 side, an AC/DC converter 11 provided on the AC system 3 side, and a control unit 12 for controlling operations of these two converters.

The control unit 12 includes, for example, a computer, and implements control functions necessary for the two converters (10, 11) by the computer executing software (computer program). The software is stored in a storage device (not shown) of the control unit 12. However, it is also possible to configure the control unit 12 from only a hardware circuit not including a computer.

<Power Conversion Device>

«Circuit Configuration»

Figure 2:
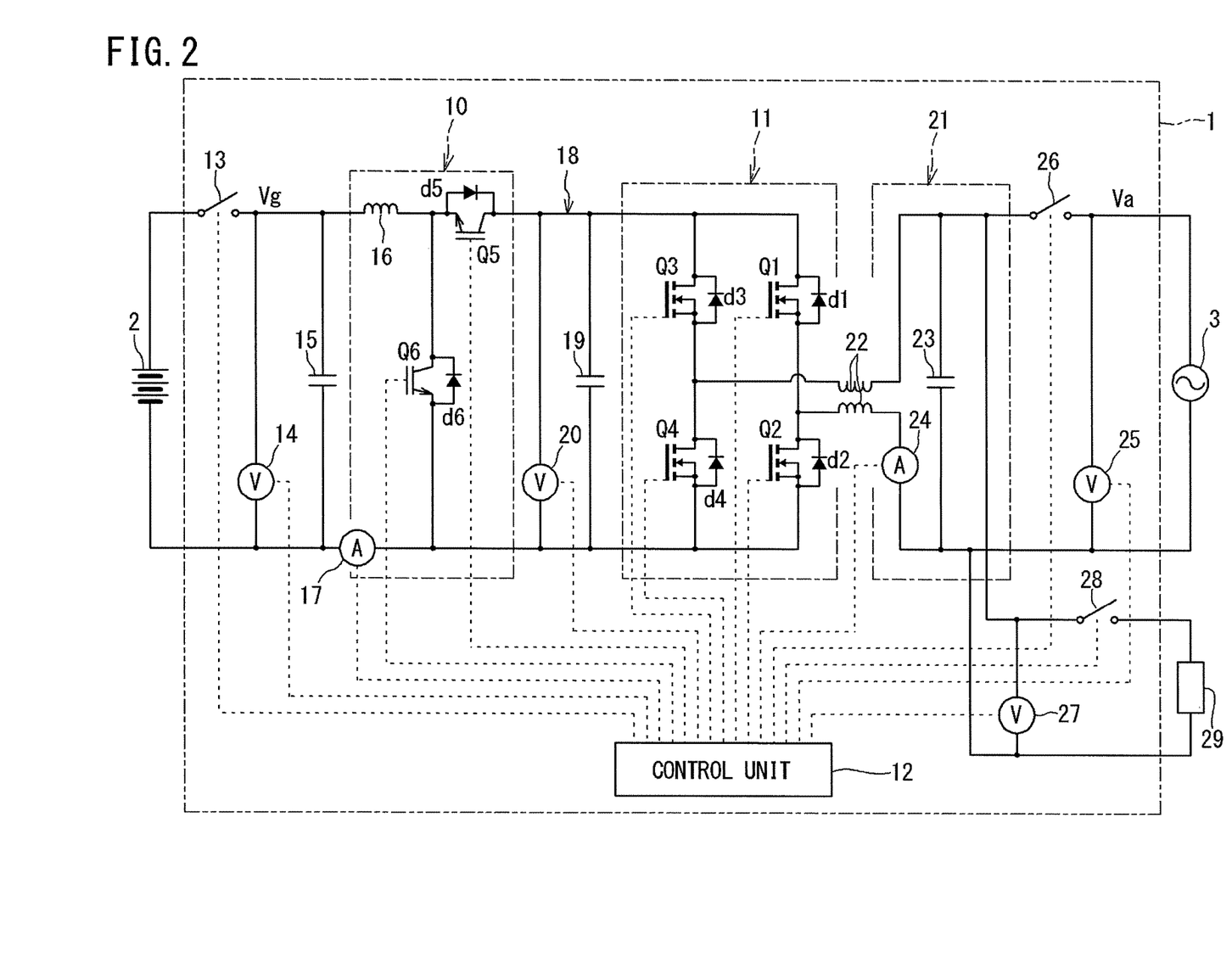
FIG. 2 is a diagram showing an example of a specific circuit diagram of the power conversion device.

FIG. 2 shows an example of a specific circuit diagram of the power conversion device 1.

In FIG. 2, a filter circuit 21 is provided between the AC/DC converter 11 and the AC system 3. A switch 26 is provided in an electric path connecting the filter circuit 21 and the AC system 3. Opening/closing of the switch 26 is controlled by the control unit 12. The switch 26 is closed while the power conversion device 1 is operating. A bidirectionally conductible semiconductor element is used as the switch 26. A voltage sensor 25 is connected in parallel to the AC system 3, and provides information of an AC voltage Va of the AC system 3 to the control unit 12.

The filter circuit 21 includes AC reactors 22, and a smoothing capacitor 23 provided on the AC system side (right side in FIG. 2) relative to the AC reactors 22. The filter circuit 21 prevents high-frequency noise generated in the AC/DC converter 11 from leaking to the AC system 3 side. Further, a current sensor 24 for detecting a current that flows in the AC reactors 22 is provided. The current that flows in the AC reactors 22 means a detection value Iinv of an AC current that flows in the AC/DC converter 11. The current sensor 24 provides information of the AC current detection value Iinv to the control unit 12.

A stand-alone output circuit is configured which is able to provide a stand-alone output to a load 29 from electric paths at both ends of the capacitor 23 in the filter circuit 21 via a stand-alone switch 28. An AC voltage of the stand-alone output is detected by the voltage sensor 27. Information of the detected voltage is provided to the control unit 12. Opening/closing of the stand-alone switch 28 is controlled by the control unit 12. When providing the stand-alone output, the control unit 12 causes the switch 26 to open and causes the stand-alone switch 28 to close.

The AC/DC converter 11 includes switching elements Q1 to Q4 forming a full-bridge circuit. The switching elements Q1 to Q4 are, for example, MOSFETs (Metal-Oxide-Semiconductor Field Effect Transistors). The switching elements Q1 to Q4, which are MOSFETs, include diodes (body diodes) d1 to d4, respectively. Each of the switching elements Q1 to Q4 is controlled by the control unit 12.

A smoothing capacitor 19 is connected to a DC bus 18 connecting the AC/DC converter 11 and the DC/DC converter 10. This capacitor 19 has a small capacitance (μF level), and exerts a smoothing function on a voltage switched at a high frequency (e.g., 20 kHz), but does not exert a smoothing function on a voltage that varies at a frequency (e.g., 100 Hz) about twice as high as the commercial frequency. A voltage of the DC bus 18 is detected by a voltage sensor 20, and information of the detected voltage is provided to the control unit 12.

The DC/DC converter 10 includes a DC reactor 16, a switching element Q5 to which a diode d5 is connected in reverse-parallel, and a switching element Q6 to which a diode d6 is connected in reverse-parallel, thereby forming a DC chopper circuit. As the switching elements Q5 and Q6, for example, IGBTs (Insulated Gate Bipolar Transistors) shown in FIG. 2 or MOSFETs can be used. Each of the switching elements Q5 and Q6 is controlled by the control unit 12.

A voltage sensor 14, a current sensor 17, and a smoothing capacitor 15 are provided on the low potential side (left side in FIG. 2) of the DC/DC converter 10. Further, a switch 13 is provided in an electric path connecting the DC/DC converter 10 and a positive electrode of the storage battery 2. Opening/closing of the switch 13 is controlled by the control unit 12. The switch 13 is closed while the power conversion device 1 is operating. As the switch 13, a bidirectionally conductible semiconductor element, or a relay contact is used.

When the switch 13 is closed, the voltage sensor 14 is connected in parallel to the storage battery 2, and detects a voltage between both ends of the storage battery 2. Information of the detected voltage is provided as a storage battery voltage Vg to the control unit 12. The current sensor 17 detects a current that flows in the DC/DC converter 10. Information of the detected current is provided as a DC current detection value Iin to the control unit 12.

«Summary of Charge/Discharge Operation»

The power conversion device 1 configured as described above is capable of performing bidirectional operation, that is, operation of charging the storage battery 2, based on the power of the AC system 3, and operation of supplying power to a load of the AC system 3, based on discharge power of the storage battery 2. In either case of charging and discharging, the AC/DC converter 11 and the DC/DC converter 10 alternately perform switching operations within ½ cycle of AC.

In the case of charging the storage battery 2, there are two states as follows: a state in which the AC/DC converter 11 performs step-up operation in cooperation with the AC reactor 22 while the DC/DC converter 10 exerts a "through" function of simply causing voltage/current to pass therethrough; and a state in which the AC/DC converter 11 simply performs rectification only while the DC/DC converter 10 performs step-down operation. The AC reactor 22 in the case where the AC/DC converter 11 performs step-up operation is a part of the AC/DC converter 11.

On the other hand, in the case of discharging the storage battery 2, there are two states as follows: a state in which the DC/DC converter 10 performs step-up operation while the AC/DC converter 11 performs periodical polarity inversion only; and a state in which the DC/DC converter 10 exerts the "through" function while the AC/DC converter 11 exerts an inverter function for step-down operation (also including polarity inversion).

«Charge Operation on Voltage Waveform Diagram»

Figure 3:
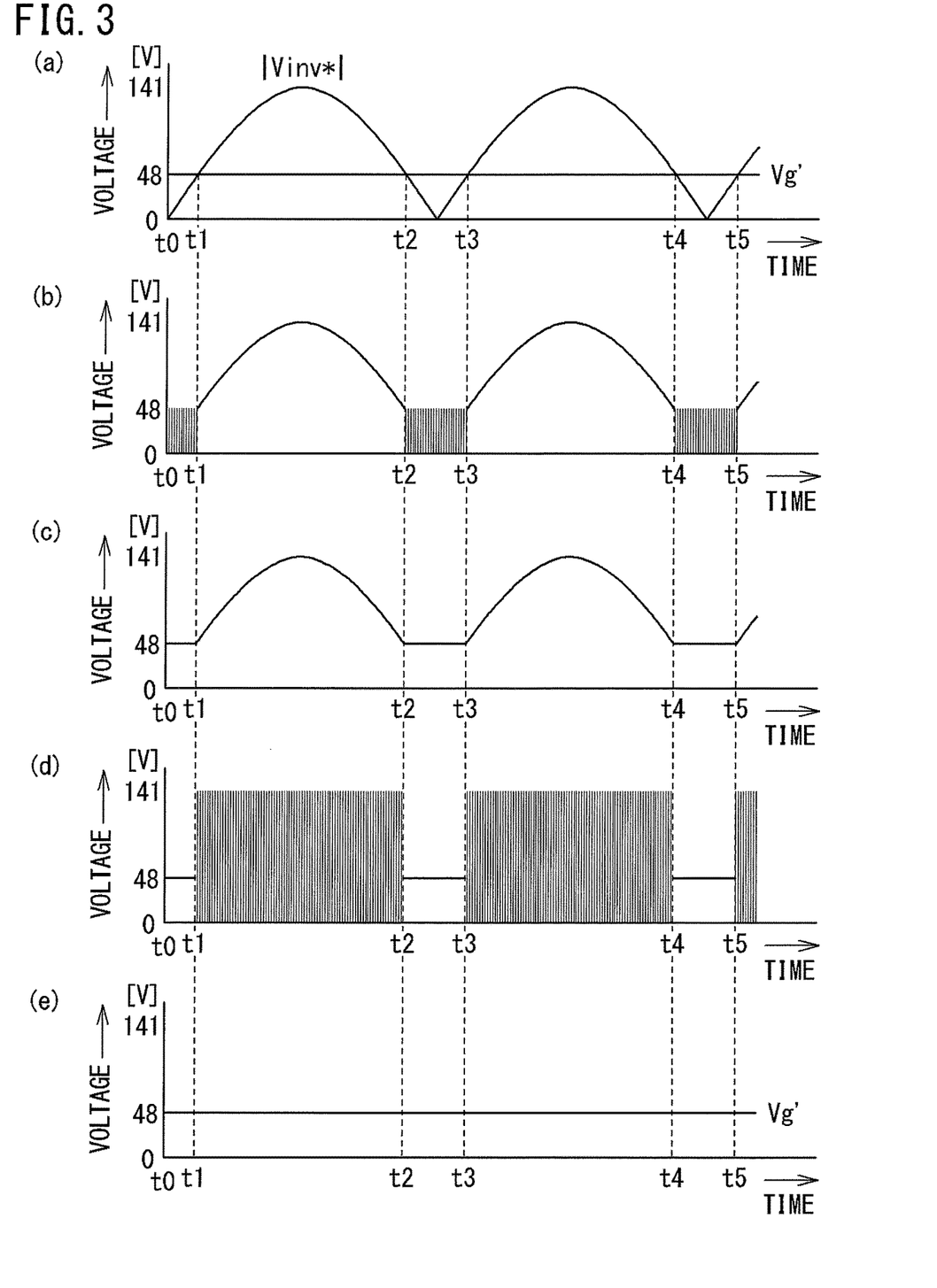
FIG. 3 is a voltage waveform diagram conceptually showing operation in a case where the power conversion device is charging a storage battery.

FIG. 3 is a voltage waveform diagram conceptually showing operation in a case where the power conversion device 1 configured as described above is charging the storage battery 2.

In FIG. 3, (a) shows an absolute value of an AC voltage target value Vinv* (peak value: about 141 V, effective value: about 100 V), and a DC voltage target value Vg' (about 48 V). The AC voltage target value Vinv* is a voltage value to be attained at an input end of the AC/DC converter 11 during charge operation, on the basis of the AC voltage Va. If an impedance of the AC reactor 22 is ignored, Vinv*=Va is satisfied. The DC voltage target value Vg' is a voltage value of the storage battery voltage Vg taking into account a voltage drop of the DC reactor 16. If an impedance of the DC reactor 16 is ignored, Vg'=Vg is satisfied.

The voltage values described above are merely examples. The control unit 12 compares these two voltages, and controls the AC/DC converter 11 and the DC/DC converter 10 on the basis of a result of the comparison.

There are two cases as follows:

(#1) In a period from t0 to t1, a period from t2 to t3, and a period from t4 to t5, the absolute value of the AC voltage target value Vinv* is smaller than the DC voltage target value Vg' (or smaller than or equal to Vg').

(#2) For example, in a period from t1 to t2 and a period from t3 to t4, the absolute value of the AC voltage target value Vinv* is greater than or equal to the DC voltage target value Vg' (or greater than Vg').

Thus, depending on whether the case is (#1) or (#2), converters mainly performing switching operation are alternated.

Since a case where Vg'=|Vinv*| can be included in either (#1) or (#2), the following description will be made focusing on the case where the absolute value of the AC voltage target value Vinv* is smaller than the DC voltage target value Vg', and the case where the absolute value of the AC voltage target value Vinv* is greater than the DC voltage target value Vg'.

First, as shown in (b) of FIG. 3, during the periods (from t0 to t1, from t2 to t3, and from t4 to t5) in which the absolute value of the AC voltage target value Vinv* is smaller than the DC voltage target value Vg', the control unit 12 causes the AC/DC converter 11 to perform switching operation, thereby to perform step-up operation in cooperation with the AC reactor 22. The "switching" mentioned here means high-frequency switching at about 20 kHz, for example, and does not mean switching at such a low frequency (twice as high as the commercial frequency) that is used for performing synchronous rectification.

Meanwhile, during these periods (from t0 to t1, from t2 to t3, and from t4 to t5), the switching element Q6 is OFF and the switching element Q5 is ON in the DC/DC converter 10, and therefore, the DC/DC converter 10 causes the voltage to pass therethrough. It is noted that a vertical stripe pattern shown in (b) of FIG. 3 is actually a PWM (Pulse Width Modulation) pulse train, and the duty thereof varies in accordance with a potential difference for stepping up to the DC voltage target value Vg'. As a result, the voltage arising at the DC bus 18 has a waveform as shown in (c) of FIG. 3.

During the periods (from t1 to t2, and from t3 to t4) in which the absolute value of the AC voltage target value Vinv* is greater than the DC voltage target value Vg', the control unit 12 causes the AC/DC converter 11 to stop switching operation, and causes the DC/DC converter 10 to perform switching operation, thereby to perform step-down operation. The AC/DC converter 11 which has stopped switching operation performs full-wave rectification by using the diodes d1 to d4.

A vertical stripe pattern shown in (d) of FIG. 3 is actually a PWM pulse train, and the duty thereof varies in accordance with a potential difference between the absolute value of the AC voltage target value Vinv* and the DC voltage target value Vg'. As a result of the step-down operation, a desired DC voltage target value Vg' as shown in (e) of FIG. 3 is obtained, whereby the storage battery 2 can be charged.

As described above, the AC/DC converter 11 and the DC/DC converter 10 alternately perform switching operations, and when one of the converters performs switching operation, the other converter stops switching operation. That is, for each of the AC/DC converter 11 and the DC/DC converter 10, a period during which switching operation is stopped arises. Thus, in this control method, switching loss in the power conversion device 1 as a whole can be greatly reduced, as compared with the control method in which two converters each always perform switching operation.

«Specifications of Control at Charging»

Various values in the power conversion device 1 are defined as follows.

Ia*: target value for a current from the AC system 3
Iin: detection value of a DC current of the DC/DC converter 10 (detected by the current sensor 17)
Iin*: target value for a current of the DC/DC converter 10
Iinv*: target value for an AC current of the AC/DC converter 11
Ig*: target value for a DC current of the storage battery 2
Ic: current flowing in the capacitor 19
Ica: current flowing in the capacitor 23
Va: AC voltage
Vg: storage battery voltage
Vinv*: target value for an AC voltage of the AC/DC converter 11
Vo*: target value for a voltage, on the DC bus 18 side, of the DC/DC converter 10
Pin: input power to the storage battery 2
$P_{Loss}$: power loss in the power conversion device 1
η: power conversion efficiency of the power conversion device 1

An average value <Pin> of the input power Pin to the storage battery 2 is represented as follows:

$$<Pin>=<Iin \times Vg> \quad (1)$$

It is noted that a notation "< >" indicates an average value (the same applies hereafter).

An average value <Ia*> of the target value for the current from the AC system 3 is represented as follows:

$$<Ia^*>=<Ig^* \times Vg>/(\eta \times <Va>) \quad (2)$$

where η is a constant representing the conversion efficiency of the power conversion device 1.

The current target value Ia* is represented as follows:

$$Ia^*=(2^{1/2}) \times <Ia^*> \times \sin \omega t \quad (3)$$

Meanwhile, the AC current target value Iinv* for the AC/DC converter 11, taking into account a capacitance Ca of the capacitor 23, is represented as follows:

$$Iinv^*=Ia^*-sCaVa \quad (4)$$

where "s" is a Laplace operator (the same applies hereafter).

Assuming that the impedance of the AC reactor 22 is Za, the AC voltage target value Vinv* is represented as follows:

$$Vinv^*=Va-ZaIinv^* \quad (5)$$

The target value Vo* for the input voltage to the DC/DC converter 10 is represented as follows:

$$Vo^*=\text{Max}(Vg+Z \text{ Iin, absolute value of } Vinv^*) \quad (6)$$

It is noted that "Max" indicates a larger one of the values in the parentheses, and Z is an impedance of the DC reactor 16. In expression (6), (Vg+Z Iin) is the DC voltage target value Vg' described above.

The current target value Iin* for the DC/DC converter 10 is represented as follows:

$$Iin^*=\{(Iinv^* \times Vinv^*)-(sCVo^*) \times Vo^*\}/(Vg+ZIin) \quad (7)$$

If the electrostatic capacitance C and the power loss $P_{LOSS}$ of the capacitor 19 are sufficiently smaller than (Iinv* × Vinv*), the following expression (8) is obtained. Iin* calculated by this expression (8) can be used as Iin included in the right-hand sides of expressions (6) and (7).

$$Iin^*=(Iinv^* \times Vinv^*)/Vg \quad (8)$$

As described above, the control unit 12 performs control so as to cause the DC/DC converter 10 to operate in the case of outputting a voltage corresponding to a part where the absolute value of the AC voltage target value Vinv* for the AC/DC converter 11 is higher than the DC voltage target value (Vg+Z Iin), and cause the AC/DC converter 11 to operate in the case of outputting a voltage corresponding to a part where the absolute value of the AC voltage target value Vinv* for the AC/DC converter 11 is smaller than the DC voltage target value (Vg+Z Iin). Thus, switching loss in the AC/DC converter 11 and the DC/DC converter 10 can be reduced, and DC power can be outputted with increased efficiency.

Furthermore, since both the DC/DC converter 10 and the AC/DC converter 11 operate based on the target values set by the control unit 12, occurrence of phase-deviation or distortion in the AC current inputted to the AC/DC converter 11 can be inhibited even if operation is performed so as to alternately switch the high-frequency switching period between the two circuits.

«Operation at Start of Charging»

Next, operation in a case where charging of the storage battery 2 is started from the AC system 3 by using the power conversion device 1 described above will be described.

In order to start charging, first, in FIG. 2, the control unit 12 causes the switch 13 to close. When the switch 13 is closed, the capacitor 15 is charged with the storage battery voltage Vg, and further, the capacitor 19 is charged with the storage battery voltage Vg through the DC reactor 16 and the diode d5. The voltage on the DC bus 18 is generally equal to Vg (48 V). Subsequently, the control unit 12 causes the switch 26 to close at zero cross timing of the AC voltage Va.

Figure 4:
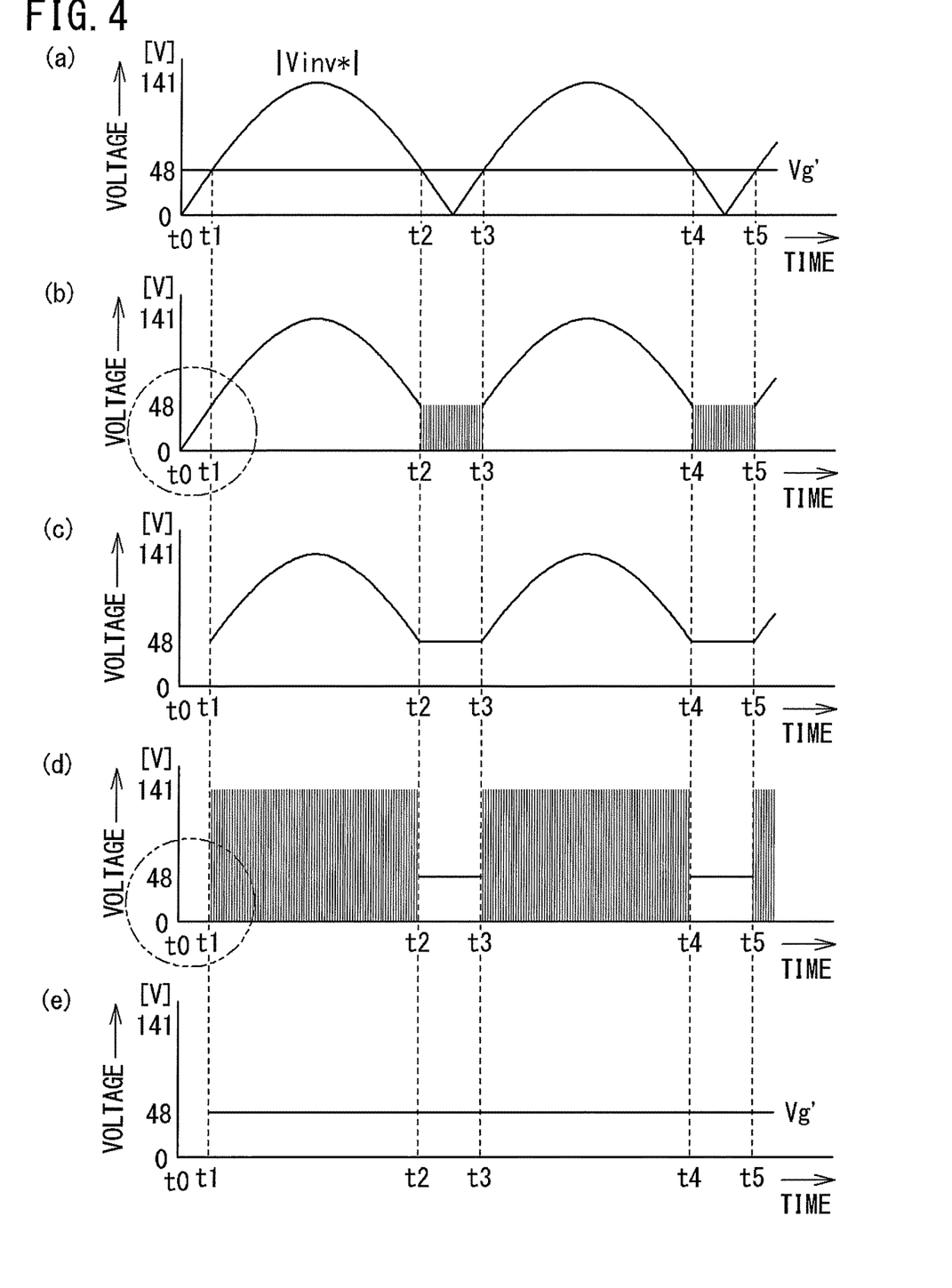
FIG. 4 is a voltage waveform diagram conceptually showing operation from start of charging by the power conversion device.

FIG. 4 is a voltage waveform diagram, which is approximate to FIG. 3, conceptually showing the operation of the power conversion device 1 from start of charging, whereas FIG. 3 shows the state during charging. Assuming that the switch 26 is closed at time t0, the AC/DC converter 11 should perform switching operation during the period from t0 to t1 in terms of the control method. However, the control unit 12 does not cause the AC/DC converter 11 to operate during the period from t0 to t1 (a circle in (b) of FIG. 4).

Therefore, the switching elements Q1 to Q4 are OFF, and the reverse voltage blocking function of the diodes d1 to d4 prevents a current from flowing toward the AC side due to the voltage of the DC bus 18. During the period from t0 to t1, the absolute value of Vinv* is smaller than or equal to the voltage of the DC bus 18. Therefore, power is not fed from the AC system 3 to the DC bus 18. That is, although the voltage of the storage battery 2 arises on the DC bus 18, a voltage contributing to charging is not supplied from the AC side. A charging voltage supplied from the AC side is shown in (c) of FIG. 4.

At time t1, the absolute value of the AC voltage target value Vinv* that increases with the AC voltage Va reaches the DC voltage target value Vg' (48 V). The DC/DC converter 10 should perform switching operation during the period from t1 to t2. Therefore, the control unit 12 causes the DC/DC converter 10 to perform switching operation on or after time t1, thereby to perform step-down operation ((d) of FIG. 4). In order to promptly start charging, it is preferable to start the switching operation on or immediately after time t1. However, the switching operation may be started at any timing within the range from t1 to t2, that is, within the period during which step-down operation is performed, in terms of the control method. Therefore, the switching operation can also be started within the subsequent period from t3 to t4.

After the switching operation of the DC/DC converter 10 has been started, normal operation is performed, and the storage battery 2 is charged. For example, in the period from t2 to t3 after start of charging, the AC/DC converter 11 performs switching operation. In this case, since the switching operation has already been started before zero crossing occurs, even if the AC voltage target value Vinv* is a voltage lower than the DC voltage target value Vg' during this period, a current does not flow from the DC bus 18 toward the AC side.

As described above, in the case of charging the storage battery 2, if charging is started within the period during which the AC voltage target value Vinv* is greater than the DC voltage target value Vg'=(Vg+Z Iin), this charging is started from the switching operation for the step-down operation by the DC/DC converter 10, and therefore, it is possible to inhibit a current from flowing in a direction reverse to the charging direction.

«Manner of Updating AC Current Target Value»

Since an inrush current flows when charging is started, a soft start function for inhibiting the inrush current may be provided. For example, the soft start function can be achieved by gradually increasing the AC current target value Iinv* from 0 to the target value. In terms of control, a current command value is periodically updated.

Figure 5:
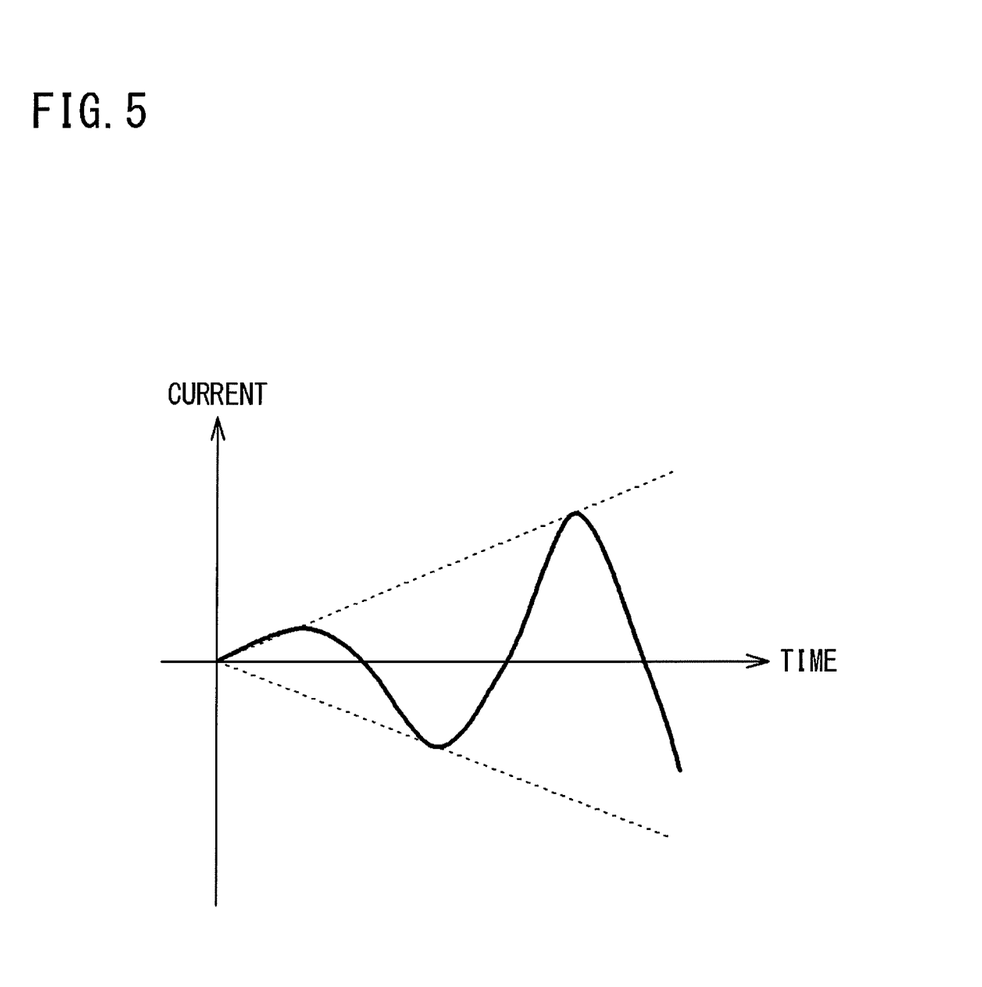
FIG. 5 is a diagram showing a method of increasing an effective value of a current at a fixed gradient.

For example, FIG. 5 shows a manner of increasing a current effective value at a fixed gradient. In this case, the command value is updated when the current flows. Therefore, the PWM duty is updated, which may cause a sharp change in the current, or may cause an oscillation.

Figure 6:
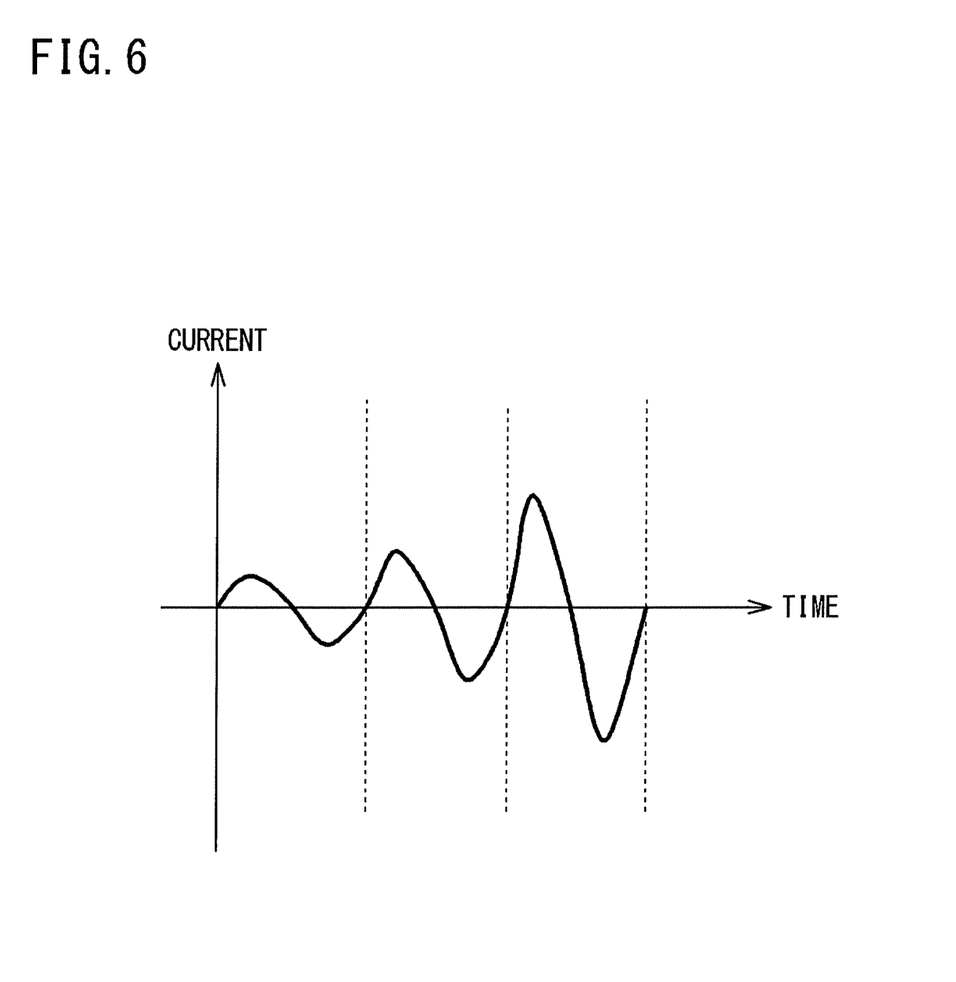
FIG. 6 is a diagram showing a manner of updating a current command value for attaining an AC current target value in charging, at zero cross timing of an AC voltage.

Therefore, as shown in FIG. 6, the control unit 12 updates the current command value for attaining the AC current target value Vinv* in charging, at zero cross timing of the AC voltage Va of the AC system 3.

In this case, updating of the PWM duty in association with updating of the command value is performed at the zero cross timing. Therefore, it is possible to inhibit occurrence of a sharp change in the current, or oscillation.

«Discharge Operation on Voltage Waveform Diagram»

Figure 7:
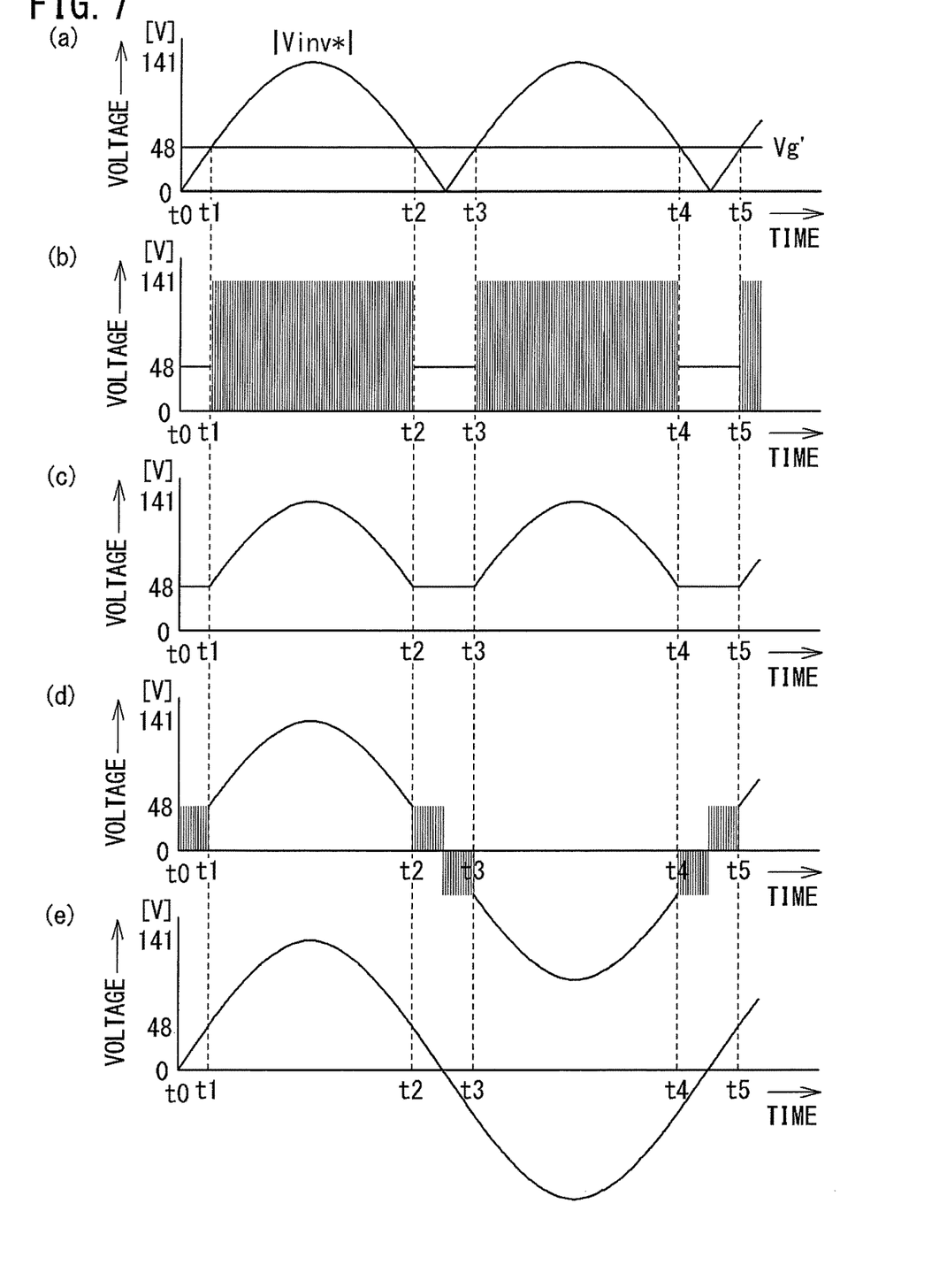
FIG. 7 is a voltage waveform diagram conceptually showing operation in a case where the power conversion device discharges the storage battery.

FIG. 7 is a voltage waveform diagram conceptually showing an operation in a case where the power conversion device 1 discharges the storage battery 2.

In FIG. 7, (a) shows an absolute value of an AC voltage target value Vinv* (peak value: about 141V, effective value: about 100V), and a DC voltage target value Vg' (about 48 V). The AC voltage target value Vinv* is a voltage value to be attained at an output end of the AC/DC converter 11 during discharge operation, on the basis of the AC voltage Va. If an impedance of the AC reactor 22 is ignored, Vinv*=Va is satisfied. The DC voltage target value Vg' is a voltage value of the storage battery voltage Vg taking into account a voltage drop of the DC reactor 16. If an impedance of the DC reactor 16 is ignored, Vg'=Vg is satisfied.

The voltage values described above are merely examples. The control unit 12 compares these two voltages, and controls the AC/DC converter 11 and the DC/DC converter 10 on the basis of a result of the comparison.

First, during the periods (from t1 to t2, and from t3 to t4) in which the absolute value of the AC voltage target value Vinv* is greater than the DC voltage target value Vg', the control unit 12 causes the DC/DC converter 10 to perform switching operation, thereby to perform step-up operation ((b) of FIG. 7). As a result, a voltage shown in (c) of FIG. 7 arises on the DC bus 18.

Meanwhile, during the periods (from t0 to t1, from t2 to t3, and from t4 to t5) in which the absolute value of the AC voltage target value Vinv* is smaller than the DC voltage target value Vg', the control unit 12 causes the AC/DC converter 11 to perform switching operation as an inverter, thereby to perform step-down operation ((d) of FIG. 7). Aside from the switching operation, the AC/DC converter 11 causes the polarity of energization to be inverted in each cycle of a frequency (e.g., 100 Hz) corresponding to twice the frequency of the AC system 3. This switching operation is extremely lower in speed than switching operation at 20 kHz, for example. Meanwhile, during the periods (from t0 to t1, from t2 to t3, and from t4 to t5) in which the AC/DC converter 11 is performing switching operation, both the switching elements Q5 and Q6 in the DC/DC converter 10 are OFF, and the DC/DC converter 10 causes the voltage/current to pass through the diode d5.

As a result, a desired AC waveform shown in (e) of FIG. 7 is obtained.

«Specifications of Control at Discharging»

Various values in the power conversion device 1 are defined as follows, as in the case of charging.

Ia*: target value for a current to the AC system 3
Iin: detection value of a DC current of the DC/DC converter 10 (detected by the current sensor 17)
Iin*: target value for a current of the DC/DC converter 10
Iinv*: target value for an AC current of the AC/DC converter 11
Ig*: target value for a DC current of the storage battery 2
Ic: current flowing in the capacitor 19
Ica: current flowing in the capacitor 23
Va: AC voltage
Vg: storage battery voltage
Vinv*: target value for an AC voltage of the AC/DC converter 11
Vo*: target value for a voltage, on the DC bus 18 side, of the DC/DC converter 10
Pin: output power from the storage battery 2 (reverse input power)
$P_{LOSS}$: power loss in the power conversion device 1
η: power conversion efficiency of the power conversion device 1

An average value <Pin> of the output power Pin from the storage battery 2 is represented as follows:

$$<Pin> = <Iin \times Vg> \tag{1'}$$

An average value <Ia*> of the target value for the current to the AC system 3 is represented as follows.

$$<Ia^*> = <Ig^* \times Vg>/(\eta \times <Va>) \tag{2'}$$

where η is a constant representing the conversion efficiency of the power conversion device 1.

The current target value Ia* is represented as follows:

$$Ia^* = (2^{1/2}) \times <Ia^*> \times \sin \omega t \tag{3'}$$

Meanwhile, the target value Iinv* for the AC current to the AC/DC converter 11, taking into account the capacitance Ca of the capacitor 23, is represented as follows:

$$Iinv^* = Ia^* + sCaVa \quad (4')$$

Assuming that the impedance of the AC reactor 22 is Za, the AC voltage target value Vinv* is represented as follows:

$$Vinv^* = Va + ZaIinv^* \quad (5')$$

The target value Vo* for the input voltage to the DC/DC converter 10 is represented as follows:

$$Vo^* = \text{Max}(Vg - Z\,Iin, \text{ absolute value of } Vinv^*) \quad (6')$$

It is noted that "Max" indicates a larger one of the values in the parentheses, and Z is an impedance of the DC reactor 16. In expression (6'), (Vg−Z Iin) is the DC voltage target value Vg'.

The current target value Iin* for the DC/DC converter is represented as follows:

$$Iin^* = \{((inv^* \times Vinv^*) + (sCVo^*) \times Vo^*\}/(Vg - ZIin) \quad (7')$$

If the electrostatic capacitance C and the power loss $P_{Loss}$ of the capacitor 19 are sufficiently smaller than (Iinv*×Vinv*), the following expression (8') is obtained. Iin* calculated by this expression (8') can be used as Iin included in the right-hand sides of expressions (6') and (7').

$$Iin^* = (Iinv^* \times Vinv^*)/Vg \quad (8')$$

As described above, the control unit 12 performs control so as to cause the DC/DC converter 10 to operate in the case of outputting a voltage corresponding to a part where the absolute value of the AC voltage target value Vinv* for the AC/DC converter 11 is higher than the DC voltage target value (Vg−Z Iin), and cause the AC/DC converter 11 to operate in the case of outputting a voltage corresponding to a part where the absolute value of the AC voltage target value Vinv* for the AC/DC converter 11 is lower than the DC voltage (Vg−Z Iin). Thus, switching loss in the AC/DC converter 11 and the DC/DC converter 10 can be reduced, and DC power can be outputted with increased efficiency.

Furthermore, since both the DC/DC converter 10 and the AC/DC converter 11 operate based on the target values set by the control unit 12, occurrence of phase-deviation or distortion in the AC current outputted from the AC/DC converter 11 can be inhibited even if operation is performed so as to alternately switch the high-frequency switching period between the two circuits.

«Operation at Start of Discharging»

Next, operation in a case where discharging of the storage battery 2 is started by using the power conversion device 1 described above will be described for each of a case of an output to a system load and a case of a stand-alone output.

(Case of Output to System Load)

In order to start discharging, first, in FIG. 2, the control unit 12 causes the switch 13 to close. When the switch 13 is closed, the capacitor 15 is charged with the storage battery voltage Vg, and further, the capacitor 19 is charged with the storage battery voltage Vg through the DC reactor 16 and the diode d5. The voltage on the DC bus 18 is generally equal to Vg (48 V). Subsequently, the control unit 12 causes the switch 26 to close at zero cross timing of the AC voltage Va.

In FIG. 7, assuming that the switch 26 is closed at time t0, the control unit 12 causes the AC/DC converter 11 to perform switching operation during the period from t0 to t1, thereby to perform step-down operation. During this period, the AC voltage target value Vinv* is smaller than or equal to the DC voltage target value Vg', and therefore, backflow of the current from the AC side to the DC bus 18 does not occur. Since then, the normal operation is performed, and the storage battery 2 is discharged.

If the AC/DC converter 11 is not caused to start switching operation during the period from t0 to t1, the AC/DC converter 11 may be caused to start switching operation during the subsequent period from t2 to t3.

As described above, when discharging the storage battery 2, if discharging is started within the period during which the AC voltage target value Vinv* is smaller than the DC voltage target value (Vg−Z Iin), this discharging is started from the switching operation for the step-down operation by the AC/DC converter 11, and therefore, a current is prevented from flowing in a direction reverse to the direction of discharging.

(Case of Stand-Alone Output)

On the other hand, in order to start discharging in the case of stand-alone output, first, in FIG. 2, the control unit 12 causes the switch 13 to close. When the switch 13 is closed, the capacitor 15 is charged with the storage battery voltage Vg, and further, the capacitor 19 is charged with the storage battery voltage Vg through the DC reactor 16 and the diode d5. The voltage on the DC bus 18 is generally equal to Vg (48 V). Subsequently, the control unit 12 causes the stand-alone switch 28 to close at zero cross timing of the stand-alone AC voltage, with the switch 26 being opened.

In FIG. 7, assuming that the stand-alone switch 28 is closed at time t0, the control unit 12 causes the AC/DC converter 11 to perform switching operation during the period from t0 to t1, thereby to perform step-down operation. During this period, the AC voltage target value Vinv* is smaller than or equal to the DC voltage target value Vg', and therefore, backflow of the current from the AC side to the DC bus 18 does not occur. Since then, the normal operation is performed, and the storage battery 2 is discharged.

If the AC/DC converter 11 is not caused to start switching operation during the period from t0 to t1, the AC/DC converter 11 can be caused to start switching operation during the subsequent period from t2 to t3.

As described above, when discharging the storage battery 2, if discharging is started within the period during which the AC voltage target value Vinv* is smaller than the DC voltage target value (Vg−Z Iin), this discharging is started from the switching operation for the step-down operation by the AC/DC converter 11, and therefore, a current is prevented from flowing in a direction reverse to the direction of discharging.

«Overview of Charge/Discharge Start Timing»

(Case of being Connected to AC System)

As described above, the control unit 12 of the power conversion device 1 compares the absolute value of the AC voltage target value Vinv* based on the AC voltage with the DC voltage target value (Vg+Z Iin or Vg−Z Iin) based on the storage battery voltage Vg, and executes, on the basis of the magnitude relation of the values, a control method such that a period during which step-up operation is performed through switching operation mainly using one of the AC/DC converter 11 and the DC/DC converter 10, and a period during which step-down operation is performed through switching operation mainly using the other one of the converters, alternately arise. When starting charging/discharging of the storage battery 2, the control unit 12 causes the switch 26 to close at zero cross timing of the AC voltage Va, and thereafter, causes charging/discharging to start from the switching operation through which the step-down operation is performed.

(Case of Stand-Alone Output)

Also in the case of stand-alone output, the control unit 12 of the power conversion device 1 compares the absolute value of the AC voltage target value Vinv* based on the AC voltage with the DC voltage target value (Vg+Z Iin or Vg−Z Iin) based on the storage battery voltage Vg, and executes, on the basis of the magnitude relation of the values, a control method such that a period during which step-up operation is performed through switching operation mainly using one of the AC/DC converter 11 and the DC/DC converter 10, and a period during which step-down operation is performed through switching operation mainly using the other one of the converters, alternately arise. When starting discharging of the storage battery 2, the control unit 12 causes the stand-alone switch 28 to close at zero cross timing of the stand-alone AC voltage, and thereafter, causes discharging to start from the switching operation through which the step-down operation is performed.

In the power conversion device 1 executing the control method described above, which of the AC/DC converter 11 and the DC/DC converter 10 mainly executes switching operation depends on the timing to start charging/discharging. If one of the two converters starts charging/discharging from switching operation for step-up operation, since the voltage of the target to be charged/discharged is higher than that of the converter, a current may flow in a direction reverse to the direction of charging/discharging. However, when charging/discharging is started from switching operation for "step-down operation", since the charging/discharging is started from the state where the voltage of the target to be charged/discharged is lower than that of the converter, it is possible to prevent a current from flowing in a direction reverse to an intended direction.

<Supplementary Notes>

In the above embodiment, when one of the AC/DC converter 11 and the DC/DC converter 10 performs switching operation, the other one stops switching operation (high-frequency). However, it is also possible to perform control such that, when the two converters alternate, both the converters perform switching operations transiently.

It is noted that the embodiments disclosed herein are merely illustrative in all aspects and should not be recognized as being restrictive. The scope of the present invention is defined by the scope of the claims rather than the meaning described above, and is intended to include meaning equivalent to the scope of the claims and all modifications within the scope.

<Additional Notes>

The above description includes the features in the additional notes below. That is, the power conversion device can also be expressed as follows.

A power conversion device provided between an AC system and a storage battery, including:

a switch provided in an electric path connected to the AC system;

a voltage sensor configured to detect an AC voltage of the AC system;

an AC/DC converter provided between the switch and a DC bus;

a capacitor connected to the DC bus;

a DC/DC converter provided between the DC bus and the storage battery;

a voltage sensor configured to detect a voltage between both ends of the storage battery, as a storage battery voltage; and a control unit configured to compare an absolute value of an AC voltage target value based on the AC voltage with a DC voltage target value based on the storage battery voltage, execute, on the basis of a magnitude relation of the values, a control method such that a period during which step-up operation is performed through switching operation mainly using one of the AC/DC converter and the DC/DC converter, and a period during which step-down operation is performed through switching operation mainly using the other one of the converters, alternately arise within a (½) cycle of the AC voltage target value, and in a case of starting charging/discharging of the storage battery, cause the switch to close at zero cross timing of the AC voltage, and thereafter, cause charging/discharging to start within the period during which the step-down operation is performed, thereby providing a state in which a charge current flows due to the step-down operation when charging is started, and a state in which a discharge current flows due to the step-down operation when discharging is started.

REFERENCE SIGNS LIST 1 power conversion device
2 storage battery
3 AC system
10 DC/DC converter
11 AC/DC converter
12 control unit
13 switch
14 voltage sensor
15 capacitor
16 DC reactor
17 current sensor
18 DC bus
19 capacitor
20 voltage sensor
21 filter circuit
22 AC reactor
23 capacitor
24 current sensor
25 voltage sensor
26 switch
27 voltage sensor
28 stand-alone switch
29 load
d1 to d6 diode
Q1 to Q6 switching element

The invention claimed is:

1. A power conversion device provided between an AC system and a storage battery, the power conversion device comprising:

a switch provided in an electric path connected to the AC system;

a voltage sensor configured to detect an AC voltage of the AC system;

an AC/DC converter provided between the switch and a DC bus;

a capacitor connected to the DC bus;

a DC/DC converter provided between the DC bus and the storage battery;

a voltage sensor configured to detect a voltage between both ends of the storage battery, as a storage battery voltage; and a control unit configured to compare an absolute value of an AC voltage target value based on the AC voltage with a DC voltage target value based on the storage battery voltage, execute, on the basis of a magnitude relation of the values, a control method such that a period during which step-up operation is performed through switching operation using one of the AC/DC converter and the DC/DC converter when other one is stopped, and a period during which step-down operation is performed through switching operation using the other one of the converters when the one is stopped, alternately arise, and when starting charging/discharging of the storage battery, cause the switch to close at zero cross timing of the AC voltage, and thereafter, cause charging/discharging to start from the switching operation through which the step-down operation is performed.

2. A power conversion device provided between an AC system and a storage battery, the power conversion device comprising:
a switch provided in an electric path connected to the AC system;
a voltage sensor configured to detect an AC voltage of the AC system;
an AC/DC converter provided between the switch and a DC bus;
a capacitor connected to the DC bus;
a DC/DC converter provided between the DC bus and the storage battery;
a voltage sensor configured to detect a voltage between both ends of the storage battery, as a storage battery voltage; and
a control unit configured to compare an absolute value of an AC voltage target value based on the AC voltage with a DC voltage target value based on the storage battery voltage, and
in a case of charging the storage battery,
when the absolute value of the AC voltage target value is smaller than the DC voltage target value, the control unit causes the step-up operation to be performed through the switching operation using the AC/DC converter,
when the absolute value of the AC voltage target value is greater than the DC voltage target value, the control unit causes the step-down operation to be performed through the switching operation using the DC/DC converter, and
when starting charging of the storage battery, the control unit causes the switch to close at the zero cross timing of the AC voltage, and thereafter, causes charging to start within a period during which the absolute value of the AC voltage target value is greater than the DC voltage target value.

3. The power conversion device according to claim 2, wherein the control unit updates a command value for attaining an AC current target value in charging, at zero cross timing of the AC voltage.

4. A power conversion device provided between an AC system and a storage battery, the power conversion device comprising:
a switch provided in an electric path connected to the AC system;
a voltage sensor configured to detect an AC voltage of the AC system;
an AC/DC converter provided between the switch and a DC bus;
a capacitor connected to the DC bus;
a DC/DC converter provided between the DC bus and the storage battery;
a voltage sensor configured to detect a voltage between both ends of the storage battery, as a storage battery voltage; and
a control unit configured to compare an absolute value of an AC voltage target value based on the AC voltage with a DC voltage target value based on the storage battery voltage, and
in a case of discharging the storage battery,
when the absolute value of the AC voltage target value is greater than the DC voltage target value, the control unit causes the step-up operation to be performed through the switching operation using the DC/DC converter,
when the absolute value of the AC voltage target value is smaller than the DC voltage target value, the control unit causes the step-down operation to be performed through the switching operation using the AC/DC converter, and
when starting discharging of the storage battery, the control unit causes the switch to close at the zero cross timing of the AC voltage, and thereafter, causes discharging to start within a period during which the absolute value of the AC voltage target value is smaller than the DC voltage target value.

5. A power conversion device provided between an AC system and a storage battery, the power conversion device comprising:
a switch provided in an electric path connected to the AC system;
a voltage sensor configured to detect an AC voltage of the AC system;
an AC/DC converter provided between the switch and a DC bus;
a capacitor connected to the DC bus;
a DC/DC converter provided between the DC bus and the storage battery;
a voltage sensor configured to detect a voltage between both ends of the storage battery, as a storage battery voltage; and
a control unit configured to compare an absolute value of an AC voltage target value based on the AC voltage with a DC voltage target value based on the storage battery voltage; and
in a case of discharging the storage battery,
when the absolute value of the AC voltage target value is greater than the DC voltage target value, the control unit causes the step-up operation to be performed through the switching operation using the DC/DC converter,
when the absolute value of the AC voltage target value is smaller than the DC voltage target value, the control unit causes the step-down operation to be performed through the switching operation using the AC/DC converter, and
when starting discharging of the storage battery, the control unit causes a stand-alone switch to close at zero cross timing of a stand-alone AC voltage, with the switch provided in the electric path being open, and thereafter, causes discharging to start within a period during which the absolute value of the AC voltage target value is smaller than the DC voltage target value.

6. A method for controlling a power conversion device which is provided between an AC system and a storage battery, and includes a switch provided in an electric path connected to the AC system, an AC/DC converter provided between the switch and a DC bus, a capacitor connected to the DC bus, and a DC/DC converter provided between the DC bus and the storage battery, the method comprising:
comparing an absolute value of an AC voltage target value based on an AC voltage of the AC system with a DC voltage target value based on the storage battery voltage; and executing, on the basis of a magnitude relation of the values, a control method such that a period during which step-up operation is performed through switching operation using one of the AC/DC converter and the DC/DC converter when other one is stopped, and a period during which step-down operation is performed through switching operation using the other one of the converters when the one is stopped, alternately arise, wherein when starting charging/discharging of the storage battery, the switch is closed at zero cross timing of the AC voltage, and thereafter, charging/discharging is started from the switching operation through which the step-down operation is performed.

7. A power conversion device provided between an AC system and a storage battery, the power conversion device comprising:

a switch provided in an electric path connected to the AC system;

a voltage sensor configured to detect an AC voltage of the AC system;

an AC/DC converter provided between the switch and a DC bus;

a capacitor connected to the DC bus;

a DC/DC converter provided between the DC bus and the storage battery;

a voltage sensor configured to detect a voltage between both ends of the storage battery, as a storage battery voltage; and a control unit configured to compare an absolute value of an AC voltage target value based on the AC voltage with a DC voltage target value based on the storage battery voltage, execute, on the basis of a magnitude relation of the values, a control method such that a period during which step-up operation is performed through switching operation using one of the AC/DC converter and the DC/DC converter when other one is stopped, and a period during which step-down operation is performed through switching operation using the other one of the converters when the one is stopped, alternately arise within a (½) cycle of the AC voltage target value, and in a case of starting charging/discharging of the storage battery, cause the switch to close at zero cross timing of the AC voltage, and thereafter, cause charging/discharging to start within the period during which the step-down operation is performed, thereby providing a state in which a charge current flows due to the step-down operation when charging is started, and a state in which a discharge current flows due to the step-down operation when discharging is started.

* * * * *